April 21, 1925.

V. B. ROGERS 1,534,140

CUFF LINK

Filed Jan. 7, 1925

INVENTOR
Victor B. Rogers
BY
George C. Shean
his ATTORNEY

Patented Apr. 21, 1925.

1,534,140

UNITED STATES PATENT OFFICE.

VICTOR BEAM ROGERS, OF BUFFALO, NEW YORK.

CUFF LINK.

Application filed January 7, 1925. Serial No. 958.

*To all whom it may concern:*

Be it known that I, VICTOR B. ROGERS, a citizen of the United States, and resident of Buffalo, in the county of Erie and State of New York, have invented certain new and useful Improvements in Cuff Links, of which the following is a specification.

My present invention relates to cuff links of the general character in which the shank includes a plurality of telescopic members yieldingly held in collapsed or telescoped position, preferably by means of a retractile spring. The object of such a construction is to hold the ends of the cuffs close together under ordinary conditions and yet permit relatively wide separation of the ends and sliding of the cuffs upwardly on the arm without removing the links from the button holes in the cuffs. One form of said link is shown in my prior Patent No. 1,387,557, of August 16, 1921.

One of the objects of the present invention is to provide cuff links of the above character in which the shank when in completely telescoped position will retain the buttons or heads of the link quite close together yet in which the link may be extended to three or more times its normal length when the various sections thereof are completely extended out of their telescoped position. One feature of the present invention is the provision of novel means for universally connecting the buttons, or heads to the ends of the shank in such a manner that the heads are free to tilt at any angle relative to the shank to facilitate the insertion of the links into the button holes and also so that the distance to which the cuff may be pulled up on the arm is limited only by the extensibility of the shank itself. Thus, when the shank is in fully extended position the heads will lie approximately flatly against the arm and not have a tendency to retain a right angular position relative to the shank and dig into the flesh, as they would be otherwise likely to do with a soft cuff. The universal connection between the shanks and the heads is preferably accomplished by making the heads of approximately hollow dome shape with inwardly turned flanges which prevent displacement of approximately cone shaped helical springs housed in the domes and having their smaller ends secured on or to the shanks. These springs offer a very effective universal connection between the heads and the shanks, retaining the tops of the domes firmly against the ends of the shanks when the shanks are telescoped and permitting slight axial movement of the heads away from the shanks when the latter are fully extended.

Further features of the invention which will be more fully described hereafter are the novel means for anchoring the retractile spring which tends to keep the shank in telescoped position, the novel means for holding the spiral springs against slipping over the ends of the shanks and the unique method by which the heads are assembled on their supporting springs.

The invention may be more fully understood from the following description in connection with the accompanying drawings, wherein, Fig. 1 is a view in side elevation of a cuff link embodying the invention, the dotted lines indicating the tilted positions of the head or button members;

Figure 1:
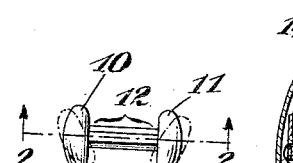
Figure 2:
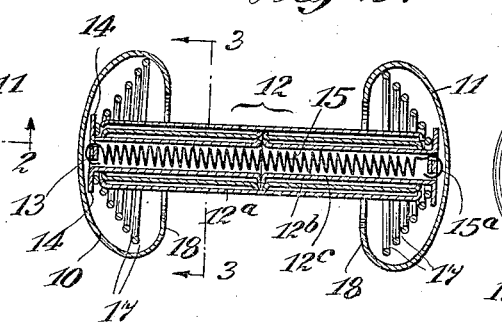
Fig. 2 is an enlarged longitudinal sectional view on the line 2—2 of Fig. 1.
Figure 3:
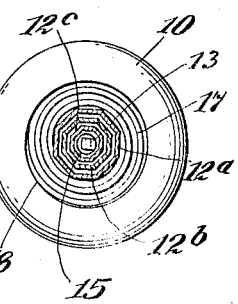
Fig. 3 is a transverse sectional view on the line 3—3 of Fig. 1.
Figure 4:
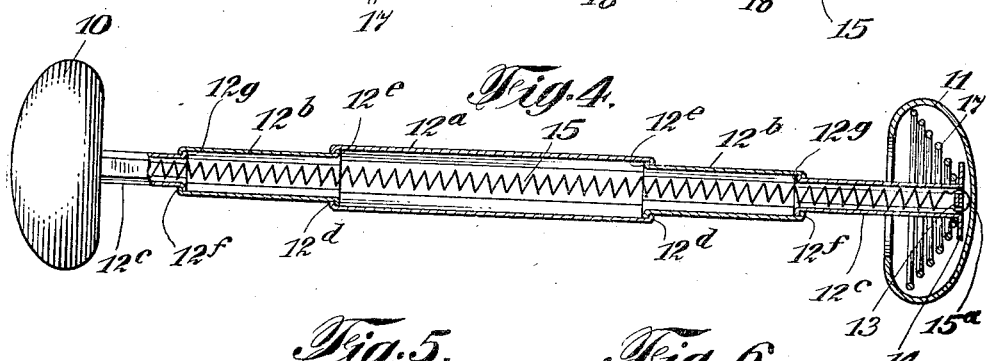
Fig. 4 is a longitudinal sectional view through the link in extended position.
Figure 5:
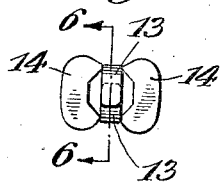
Figs. 5 and 6 are detail views of the spring retaining tongues.
Figure 6:
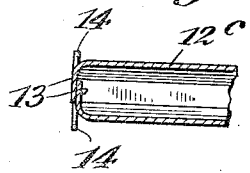

Reference characters 10 and 11 designate the two buttons or heads of the link. The shank, indicated generally at 12, includes a main central section $12^a$ within which telescope a pair of sections $12^b$ of smaller diameter, the latter sections in turn accommodating further reduced sections $12^c$. The central shank section includes at its ends inwardly turned flanges $12^d$ cooperating with outwardly turned flanges $12^e$ on the sections $12^b$ to limit the extensible movement of the latter sections. Sections $12^b$ in turn are provided at their outer ends with inwardly turned flanges $12^f$ cooperating with the outwardly turned flanges $12^g$ on the inner ends of the sections $12^c$ to limit the outward movement of the sections $12^c$.

In this connection it is obvious that numerous expedients might be resorted to for checking the relative movement of the various sections toward extended position and that the number of sections which can be used is limited only by the practical necessity for maintaining the cross-sectional area of the largest section within reasonable limits. So far as the present invention is concerned, the sections of the telescopic link may be of any suitable cross section either circular or if desired, oval or polygonal to prevent rotation of the sections one within the other.

The sections 12° are each provided at their outer ends with two pairs of diametrically disposed tongues 13, 14 formed by longitudinally slitting the sections at four points and bending the tongues defined by such slots either outwardly or inwardly. The pair of inwardly projecting tongues 13 affords convenient anchorage for the looped ends 15ª of a relatively light contractile spring 15 which is of sufficiently small diameter to conveniently fit within the sections 12°. This spring normally retains the parts in their telescoped position. Helical springs 17 of the conical formation illustrated are slipped over the ends of sections 12° before the tongues 14 are turned outwardly, said tongues extending outwardly sufficiently far to engage one or more of the smaller loops of the springs.

The conical springs are of greater normal depth than the depth of the approximately dome shaped heads 10 and 11, so that when the springs are inserted within the heads they will tend to retain the heads firmly pressed against the ends of the shanks. The springs, however, have a tendency to turn inside out when the link is extended so that while the normal distance between the heads is less than the length of 12°, this distance is actually greater than the total length of all the extended links if sufficient tension be exerted on the link. The heads are provided with inwardly turned flanges 18, the internal diameter of which is considerably less than the larger loops of the helical springs. In assembling the heads upon the spiral springs it is preferable that the springs be threaded into the heads by engaging one of the convolutions of the springs under the flange of the head and relatively retaining the two members. It is possible, however, to coil the springs directly on the shanks and within the heads after the tongues 18 have been turned over in which instance the head, is held in place and a length of spring wire coiled around the shanks into proper conformation, being simultaneously rolled into the dome shaped head.

Figure 7:
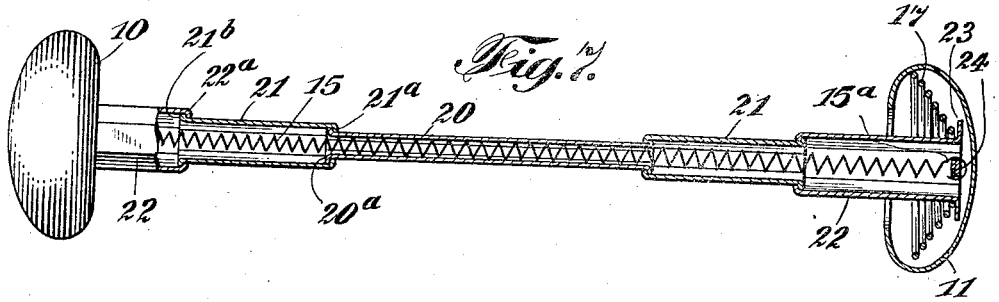
Fig. 7 is a view similar to Fig. 4, illustrating a slight modification

In the alternative form of construction shown in Fig. 7, the position of the telescopic sections is reversed. The smallest section being at the center and the larger sections telescoping thereon. In this instance, the central section 20 is provided with outwardly turned flanges 20ª at its ends engaging with inwardly turned flanges 21ª at the inner ends of the intermediate sections 21, the latter in turn being provided with outwardly turned flanges 21ᵇ at their outer ends cooperating with inwardly turned flanges 22ª of the outermost sections 22 to limit the telescopic movement of the latter. The domelike heads are attached in the manner above described, the conical helical springs being retained on the shank by tongues 23 struck outwardly from the outer ends of the largest sections and the contractile spring being anchored to inwardly turned tongues 24. An advantage of using this type of construction is the fact that there is no danger of the intermediate and central section catching or hooking on the edge of the cuff button hole when putting the buttons in a shirt.

The assembly of buttons made in accordance with the present invention may be quickly accomplished by unskilled operatives. The button or heads may of course be ornamented in any suitable manner to enhance the attractive appearance of the links and as a matter of fact, their shape may be considerably varied, without departing from the invention, it being simply necessary that the heads be hollow and of a shape which will conveniently accommodate the conical helical spring or some equivalent connecting device which will provide a universal mounting.

I claim:

1. A cuff link, including a shank, a conical helical spring on the shank and a hollow dome like button member housing the spring whereby the latter is universally connected to the shank.

2. A cuff link, including a plurality of telescopic sections constituting a shank, the end sections including inwardly turned tongues, a retractile spring housed within the shank and having its ends anchored to said tongues and button members universally connected to the ends of the shank.

3. A cuff link, including a plurality of telescoping sections constituting a shank, the end sections including outwardly turned tongues, conical spiral springs retained on the shank by said tongues, hollow button members housing the springs and universally connected to the shank thereby, and a retractile spring normally retaining the sections of the shank in collapsed position.

4. A cuff link, including a shank, conical spiral springs encircling the ends of the shank, hollow dome like button members housing the springs and universally connected thereby to the ends of the shank.

5. A cuff link, including a shank, conical spiral springs encircling the ends of the shank, hollow dome like button members housing the springs and universally connected thereby to the ends of the shank, said springs being of sufficient strength to normally retain the buttons pressed against the ends of the shank and being adapted to permit movement of said buttons beyond the ends of the shank when axial tensioning strain is exerted on the link.

6. A cuff link, including a shank member formed of a plurality of telescoping sections, hollow dome like button members, conical helical springs housed within said members and connected to and encircling the shank, said springs being under compression within the button members to retain the latter against the ends of the shank.

Signed at Buffalo in the county of Erie, and State of New York, this 29th day of December, A. D. 1924.

VICTOR BEAM ROGERS.